United States Patent
Mueller

(10) Patent No.: US 9,258,871 B2
(45) Date of Patent: Feb. 9, 2016

(54) LED FLASH LIGHT AND METHOD FOR INDICATING NEAR-END-OF-LIFE STATUS OF SUCH AN LED FLASH LIGHT

(71) Applicant: Goodrich Lighting Systems GmbH, Lippstadt (DE)

(72) Inventor: Bernhard Mueller, Lippstadt (DE)

(73) Assignee: GOODRICH LIGHTING SYSTEMS GMBH (DE)

(*) Notice: Subject to any disclaimer, the term of this patent is extended or adjusted under 35 U.S.C. 154(b) by 231 days.

(21) Appl. No.: 13/890,356

(22) Filed: May 9, 2013

(65) Prior Publication Data

US 2013/0300296 A1    Nov. 14, 2013

(30) Foreign Application Priority Data

May 10, 2012    (EP) ................................... 12167435

(51) Int. Cl.
| | |
|---|---|
| H05B 37/00 | (2006.01) |
| H01J 1/60 | (2006.01) |
| H05B 37/03 | (2006.01) |
| H05B 33/08 | (2006.01) |

(52) U.S. Cl.
CPC ............ *H05B 37/03* (2013.01); *H05B 33/0803* (2013.01); *H05B 33/0893* (2013.01)

(58) Field of Classification Search
CPC ...... H05B 37/02; H05B 37/029; H05B 37/03; H05B 33/0845; H05B 33/0854; H05B 33/0866; B64D 47/06
USPC .............. 315/129–136, 120, 291, 307, 169.1, 315/224, 360, 200 A
See application file for complete search history.

(56) References Cited

U.S. PATENT DOCUMENTS

| | | | | |
|---|---|---|---|---|
| 5,926,115 A | * | 7/1999 | Schleder et al. | 340/953 |
| 6,278,382 B1 | * | 8/2001 | DeMarco | B60Q 1/2611 |
| | | | | 315/65 |
| 7,190,120 B1 | * | 3/2007 | Sansone et al. | 315/120 |
| 7,236,105 B2 | * | 6/2007 | Brenner et al. | 340/981 |
| 7,645,053 B2 | * | 1/2010 | Machi et al. | 362/241 |
| 8,773,044 B2 | * | 7/2014 | Hessling | 315/307 |
| 2002/0101189 A1 | * | 8/2002 | Vo | B64D 47/06 |
| | | | | 315/241 S |
| 2011/0006919 A1 | * | 1/2011 | Lundberg et al. | 340/963 |
| 2011/0089855 A1 | * | 4/2011 | Roberts et al. | 315/291 |

FOREIGN PATENT DOCUMENTS

EP        2273850 A2    1/2011

OTHER PUBLICATIONS

European Search Report dated Oct. 19, 2012 for Application No. 12167435.2-2206.

* cited by examiner

*Primary Examiner* — Lincoln Donovan
*Assistant Examiner* — Thomas Skibinski
(74) *Attorney, Agent, or Firm* — Cantor Colburn LLP

(57) ABSTRACT

The invention comprises a method for indicating that an LED flash light for an aircraft such as an anti-collision or beacon or strobe LED light has reached a near-end-of-life status, wherein the LED flash light under normal operational condition within a given time interval generates a predetermined number of normal flashes with the number being one or more than one, e.g. two. The method comprises the steps of determining the actual photometric condition of the LED flash light, and comparing the actual photometric condition to a given condition in a normal flashing mode. If the actual condition deviates from the given condition by more than a predetermined amount, the LED flash light is operated in order to generate within the given time interval one additional near-end-of-life-indicating flash.

4 Claims, 3 Drawing Sheets

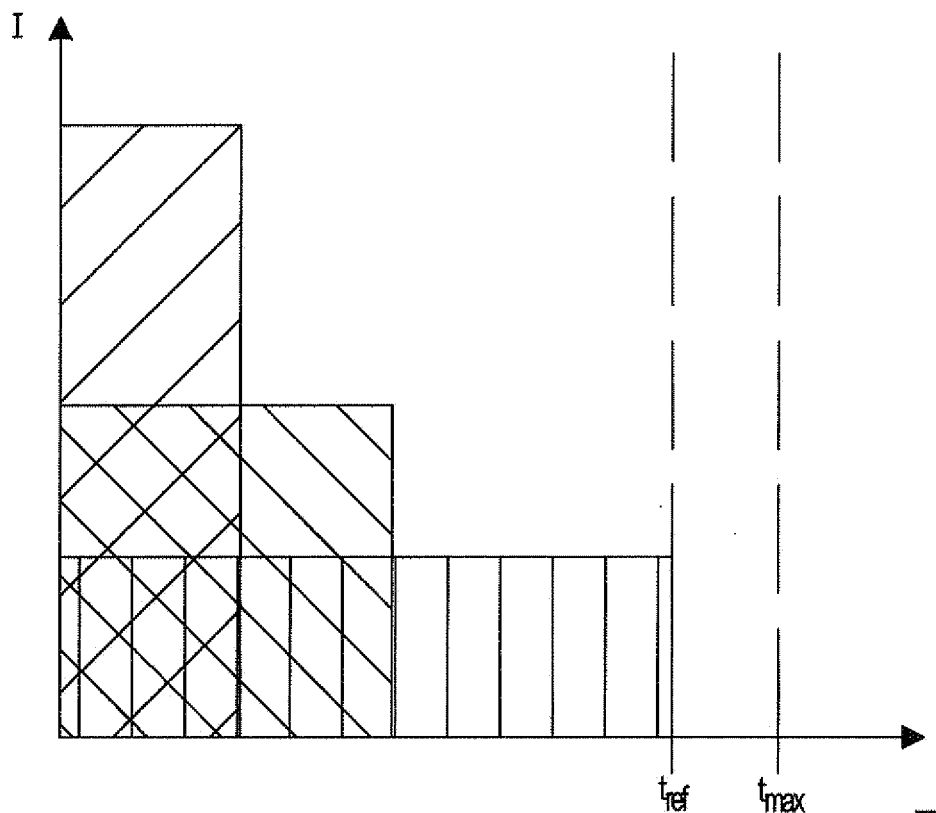
$$\int I_{ref}\, dt \,\hat{=}\, \boxed{\diagup\!\!\!\diagup} \,\hat{=}\, \boxed{|||} \,\hat{=}\, \boxed{\diagdown\!\!\!\diagdown}$$
 = $I_{hi}$ = high intensity (new cold LED)
 = $I_{mi}$ = medium intensity (older and/or hot LED)
 = $I_{li}$ = low intensity (too old and/or too hot LED)

LED FLASH LIGHT AND METHOD FOR INDICATING NEAR-END-OF-LIFE STATUS OF SUCH AN LED FLASH LIGHT

PRIORITY CLAIM

This application claims priority to European Patent Application No. 12167435.2 filed May 10, 2012, and all the benefits accruing therefrom under 35 U.S.C. §119, the contents of which in its entirety are herein incorporated by reference.

BACKGROUND OF THE INVENTION

The present invention relates to a method for indicating that an LED flash light for an aircraft such as an anti-collision or beacon or strobe LED light has reached a near-end-of-life status. Furthermore, the present invention relates to an LED flash light for an aircraft, such as an anti-collision or beacon or strobe aircraft light.

Aircrafts are provided with different types of flash lights such as anti-collision, beacon or strobe lights.

Beacon lights are known as anti-collision lights in the aircraft industry. Beacon and anti-collision lights are synonymous terms. In order to attract the required optical attention on the side of pilots, the intensity of light emitted by an anti-collision aircraft light must follow the formula of Blondel-Rey.

For maintenance and service reasons, anti-collision lights for aircrafts and, in general, aviation flash lights ever more often include LEDs instead of xenon light sources. However, the properties of LEDs degrade due to aging effects. It is known that LEDs degrade depending on the temperature and their useful life so far. These two influencing factors result in a reduced light intensity over time. This can be compensated by increasing the operational current supplied to the LEDs.

With LED technology and other light sources that rather degrade than completely fail at one point in time, such as filament based lights, it is very 5 difficult to determine when these lights no longer meet the photometric requirements. For these light sources it might be suitable to internally monitor and control the light sources accordingly. The control unit recognizes that an end-of-light status is reached but communicating this state so that the appropriate action can be performed (namely replacement) is difficult for these 10 lights. Typically, these flashing lights have no signal line or other electronic communication means to indicate an end-of-life status to a remote maintenance device or observer. The flashes are of fairly high intensity so that a direct observation of the light may be harmful to the observer, and some of the lights are located on top of the aircraft, thus not allowing to see a flashing blue LED or similar device from a distance in daylight.

Accordingly, there is a need in the state of the art to indicate in a fairly easy manner that an LED flash light has reached its end-of-light status.

SUMMARY OF THE INVENTION

The present invention provides a method for indicating that an LED flash light for an aircraft such as an anti-collision or beacon or strobe LED light has reached a near-end-of-life status, wherein the LED flash light under a normal operational condition within a given time interval generates a predetermined number of normal flashes, with the number being one or more than one, e.g. two, wherein the method comprises the steps of determining the actual photometric condition of the LED flash light, comparing the actual photometric condition to a given condition in a 30 normal flashing mode, and if the actual condition deviates from the given condition by more than a predetermined amount, operating the LED flash light for generating within the given time interval at least one additional near-end-of-life-indicating flash during the given time interval.

The present invention also provides an LED flash light for an aircraft, such as an anti-collision or beacon or strobe aircraft light, wherein the LED flash light under a normal operational condition within a given time interval generates a predetermined number of normal flashes, with the number being one or more than one, e.g. two, the LED flash light comprising at least one LED light source and a control unit for controlling the LED light source in a normal flashing mode, wherein the control unit performs the followings steps:

comparing the actual photometric condition to a given condition in the normal flashing mode, and if the actual condition deviates from the given condition by more than a predetermined amount, operating the LED flash light for generating within the given time interval at least one additional a near-end-of-life-indicating flash.

This invention describes a visual indication for flashing aviation lights such as beacon or strobe lights when a certain level of degradation is reached. The idea is to change the flash pattern of the light once a certain end-of-light status is reached, making its state easily detectable for the maintenance personnel under all circumstance while still being compliant with all legal requirements and recommendations for such flashing lights.

The invention can be easily used in aircraft for civil aviation. The legally binding requirements allow counting multiple flashes as a single flash if the entire duration of all flashes does not exceed e.g. 200 ms, which would otherwise lead to a conflict in respect to the allowable flash rates. Such a change of flash pattern is easily observable even when seeing the lights indirectly or from a far distance. It is also important that the multiple flash still has to meet the effective candela calculation per Blondel ray as described in the regulations, allowing for a certain time while the light is still good before replacing the lights. From a human factors perspective to differentiate between single and double flashes, a certain pause period has to be maintained that is longer than 20 ms, preferably even 50 ms or longer.

Accordingly, the idea has been to change the flash pattern from e.g. a single flash to a multi flash that still meets the above mentioned requirements. In general terms, the idea according to the invention is to generate an additional flash within the time interval, this additional feature indicating the upcoming (near) end-of-life status of the LED flash light.

The invention can be used for any flashing aircraft light indicating a status change of the light, not only lights changing from a single to a double flash, but also lights from double to triple flash. It is also not important what duration the individual flashes have or in what order they are executed, but for recognizing different flash-patterns, a pause of 50 ms or more in between flashes is advised.

Accordingly, the structure of the invention is to switch to a special flash pattern, when the light nears end of life, that still meets certain characteristics and performance criteria in order to comply with the various regulations, when an end-of-life status of the light is reached, and that is easily recognizable by maintenance personnel under all circumstances.

For the invention, it is not important how the near end-of-light and status of an LED flash light is determined Embodiments of LED flash lights and methods for determining the near end-of-life status are described in European patent application 11194245.4 filed on Dec. 19, 2011, the disclosure of which is incorporated herewith by reference.

Accordingly, an LED flash light in which the invention can be used, comprises
at least one LED and
a control unit for operating the at least one LED in a pulsed manner,
wherein the control unit comprises
an ambient temperature sensor for sensing the ambient temperature,
an adjustable current control means for setting an LED operating current depending on the sensed ambient temperature,
a light intensity sensor for sensing the intensity of the light emitted from the at least one LED,
a integrator connected to the light sensor for integrating the sensed light intensity, and
a comparator for comparing the integrated light intensity to a threshold value,
wherein the operating current for the at least one LED is interrupted as soon as the integrated light intensity is equal to the threshold value.

The present invention can also be used in a method for operating an anti-collision light comprising at least one LED and a control unit for operating the at least one LED in a pulsed manner, the method comprising the steps of
sensing an ambient temperature in the surrounding of the at least one LED,
adjusting an operating current for the at least one LED, the adjustable operating current being dependent on the sensed ambient temperature,
sensing the intensity of the light emitted from the at least one LED when operated in a pulsed manner with an adjusted operating current,
determining the amount of light emitted by the at least one LED during one pulse, and
comparing the determined amount of the emitted light with a threshold value,
wherein the adjusted operating current for the at least one LED is interrupted as soon as the determined amount of emitted light is equal to the threshold value.

An anti-collision aircraft light in which the invention can be used may comprise at least one LED and typically a plurality of LEDs, with each LED typically being operated in a pulsed manner so as to generate flashing light. For operating the at least one LED, a control unit is provided. This control unit comprises an adjustable current control means for setting an LED operating current which depends on the ambient temperature that the anti-collision aircraft light is subjected to. The ambient temperature is sensed by an ambient temperature sensor. In the control unit, typically an operating current for the at least one LED is set which is as high as possible taking into consideration the ambient temperature sensed. This means that preferably the light emitted by the at least one LED has an intensity as high as possible.

In the anti-collision aircraft light according to a preferred embodiment in which the invention can be used, the emitted light of the at least one LED is sensed by means of a light intensity sensor. This sensor receives the light or at least part of the light of the at least one LED, and its output signal is fed to an integrator. The integrator integrates the sensed light intensity and outputs a signal which, in a comparator, is compared to a threshold value. The threshold value is a pre-set light intensity value which has to be reached by the flashing LED for each flash in order to terminate operation of the LED for the respective interval. Accordingly, the current supplied to the at least one LED is interrupted as soon as the integrated light intensity is equal to the threshold value.

According to a preferred embodiment, the flashing interval for the anti-collision aircraft light no longer is fixed but depends on the intensity of light emitted by the anti-collision aircraft light. This means that the higher the intensity of the emitted light, the shorter the interval is (wherein it can be provided that the flashing interval does not fall below a pre-set minimum value).

As mentioned above, the light intensity properties of an LED degrade over its lifetime. Accordingly, over the lifetime the operating current supplied to the LED will have to be increased in order to obtain the required light intensity. If, due to aging effects, the LED can no longer be operated by an operating current resulting in the relatively high light intensity as at the beginning of the lifetime of the LED, the flashing intervals will become longer and longer. In a further aspect, the flashing interval lengths are monitored by means of e.g. a timer which is activated upon the begin of a flashing interval and is terminated at the end of a flashing interval. The end of the flashing interval depends on the integrated light intensity reaching the pre-set threshold intensity value. If the flashing interval becomes longer than a pre-set value, a warning signal is generated indicative of the at least one LED or the plurality of the LEDs reaching the end of their lifetime. Therefore, as soon as the flashing interval exceeds the pre-set interval value, a near-end-of-lifetime indication is generated. Accordingly, in this aspect the control unit of the anti-collision aircraft light further comprises a timer activated upon beginning of a pulsed operation control of the at least one LED and sensing the time interval within which the integrated sensed light intensity reaches the threshold value, and wherein the control unit generates a warning signal indicative of the sensed time interval exceeding a pre-set value.

As already mentioned above, the integrator typically calculates the light intensity corresponding to the effective light intensity according to the formula of Blondel-Rey.

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which:

FIG. 4 shows the decrease of the light intensity over time and correspondingly the increase of the required flashing interval for operating the anti-collision aircraft light in the required manner.

DESCRIPTION OF A PREFERRED EMBODIMENT

Figure 1:
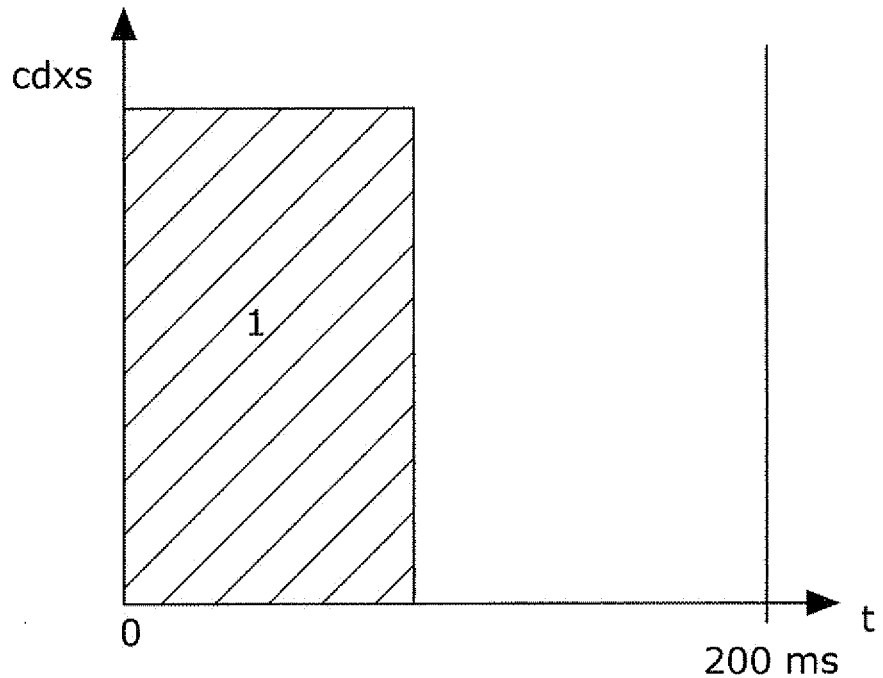
FIG. 1 is a diagram showing a flashing pattern of an LED flash light in a normal flashing mode (condition)

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an example of a flash pattern of an LED flash light generating a regular single flash, when the light is in normal operation with a flash duration of 200 ms or less.

Figure 2:
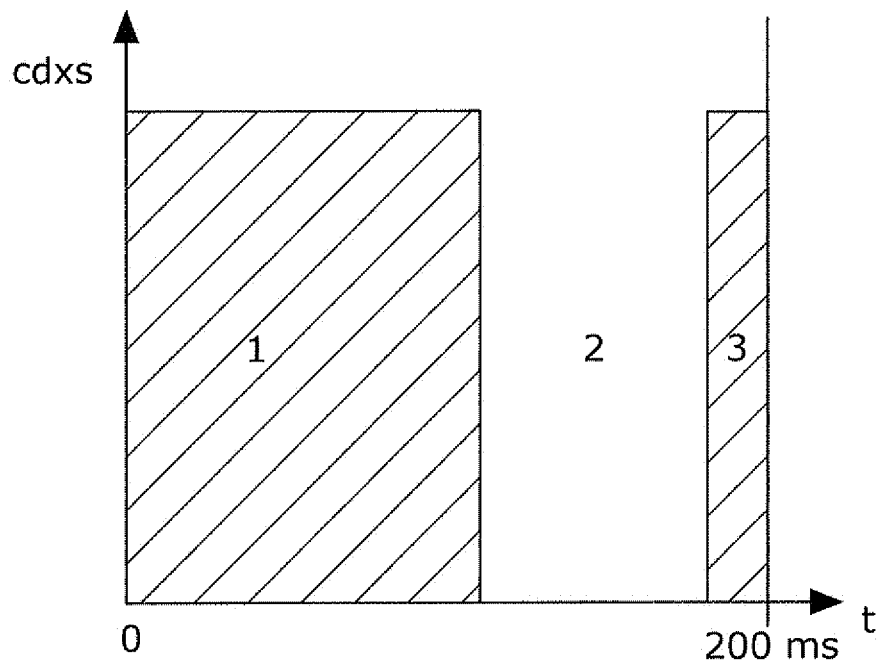
FIG. 2 is a diagram showing an example of an altered flashing for visually indicating a near end-of-life status of the LED flash light, and FIG. 3 schematically shows the circuitry in an anti-collision aircraft light in which the present invention can be used.

FIG. 2 shows an example of a flash pattern of an LED flash light generating a multiple flash, when the light is in its "(near) end of life" status with a normal flash at 1, a pause preferable 50 ms or longer at 2, and at least a second flash at 3 creating a multiple flash within 200 ms.

An embodiment of an aircraft LED flash light comprising a near end-of-life status detector, in which an LED flash light according to the invention can be used, will be described hereinbelow referring to FIGS. 3 and 4.

Figure 3:
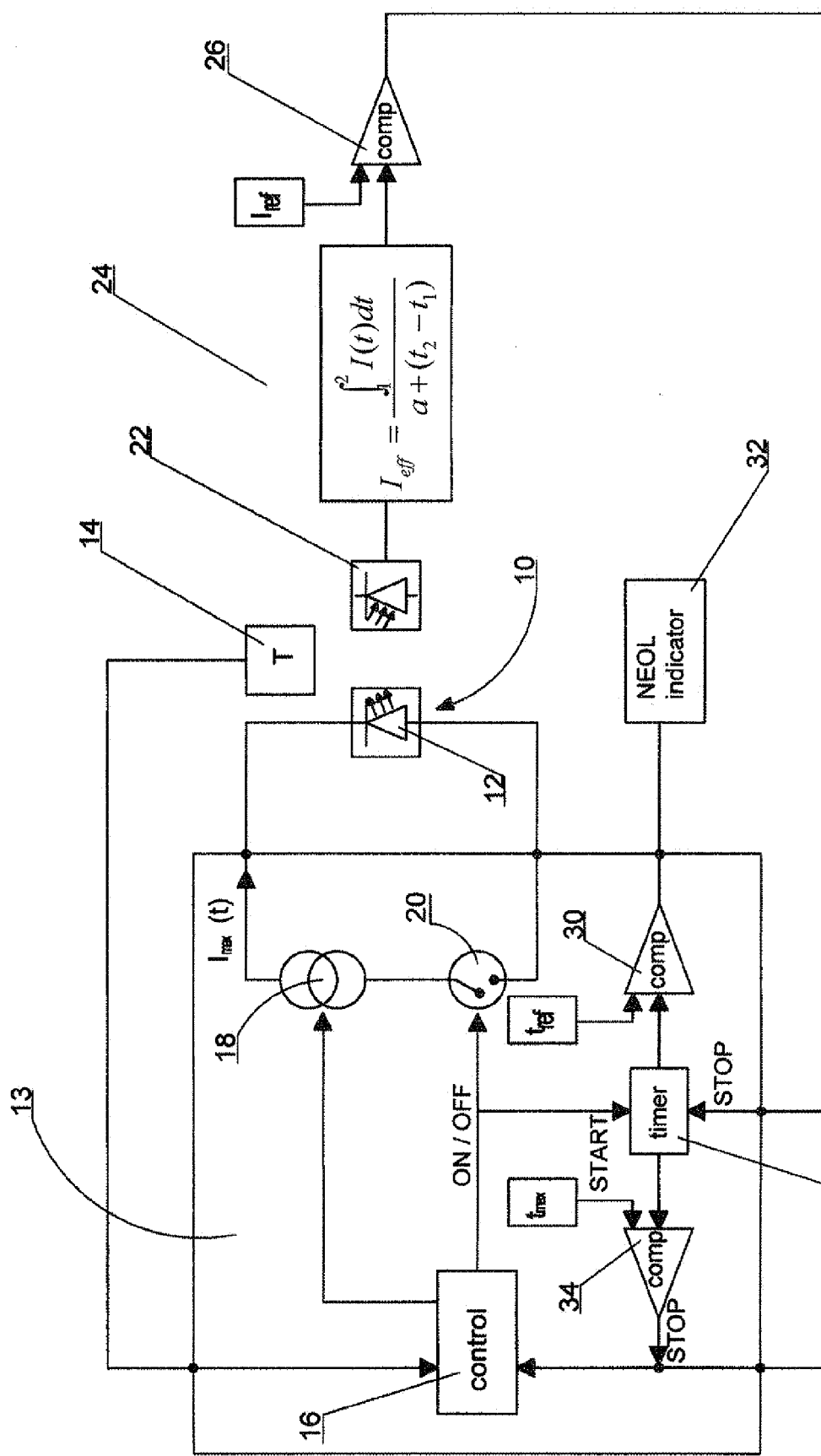

In FIG. 3, reference numeral 10 represents the plurality of light sources which in this embodiment are LEDs. The LEDs 10 are operated by means of a control unit 12 which sets an operating current $I_{MAX}(T)$. To this end, the ambient temperature of the anti-collision aircraft light is sensed by means of a temperature sensor 14. The measuring signal of the temperature sensor 14 is fed to a central control circuitry 16 which in turn controls a current source 18. Switching on and off the operation current is controlled by the control circuitry 16 and a corresponding switch 20.

The light emitted by the anti-collision aircraft light is sensed by means of an optical sensor 22 such as a photosensor. The measured signal of the optical sensor 22 is fed to an integrator 24 integrating the measured signal, i.e. integrating the light intensity of the light emitted by the LEDs 10.

The output signal of the integrator 24 is compared to a threshold value $I_{ref}$ for the light intensity to be reached for each flashing interval. A corresponding comparator 26 creates an output signal fed to the central control circuitry 16 of the control unit 12 for switching off the operating current for the LEDs 10.

Moreover, the output signal of the comparator 26 is supplied to a timer 28 which is started upon switching on the operating current at the beginning of a flashing interval. Accordingly, the timer counts and measures the length of each flashing interval. The length of the interval is compared to a pre-set value $T_{ref}$. To this end, a comparator 30 is provided. If the length of the flashing interval becomes as long as the pre-set value $T_{ref}$, the end of the useful life of the LEDs 10 is approaching. Accordingly, a corresponding warning signal is generated in a near-end-of-life (NEOL) indicator 32. The warning signal can be e.g. an optic and/or acoustic signal.

For safety reasons, the control unit 12 comprises a further time comparator 34 which compares the length of a flashing interval to a maximum allowable time interval $T_{MAX}$. This comparator 34 outputs a stop or switch-off signal for the central control circuitry 16 to terminate current supply to the LEDs 10.

FIG. 4 shows how the maximum possible light intensity I of the LEDs 10 decreases over time depending on the history of the operating currents and the ambient temperature of the anti-collision aircraft light.

The main features and aspects of this embodiment, in which the present invention can be used, can be summarized as follows.

As mentioned above, this embodiment solves the issue of achieving high visibility with a discontinuously operated Blondel-Rey effective candela controlled light. The Blondel-Rey method to calculate visibility of a flashing light is embedded in today's legislation of the leading aviation authority and cannot be changed, but the actual attention raising properties do not match the human perception for which shorter and more intensive flashes are required as they attract more attention than the Blondel-Rey calculation method suggests. Flashes based on high intensity and short duration are preferable over lower intensity and longer duration flashes despite that they may result in similar effective candela calculations per Blondel-Rey.

$$I_{eff} = \frac{\int_{t_1}^{t_2} I(t)\,dt}{a + (t_2 - t_1)}$$

where:
I(t) is the instantaneous luminous intensity of the flash,
(t2−t1) is the duration of the flash (flash interval), and a is a visual time constant, namely 0.2 s, known as the Blondel-Rey constant.

The numerator of the equation is the time-integral of I(t), which is given in the unit of cd·s.

LEDs degrade in a compound fashion over temperature as well as over time. The key element of this embodiment is to control the light (preferably) in-situ in such a way that the emitted light always stays within a predetermined ecd (effective Candela value according to Blondel-Rey) window, over the useful life of the unit. Therefore the light operates with a primarily constant current close to the safe maximum current of the LED and the flash is shut off once the emitted light is "sufficient". "Sufficient" can be determined directly with sensors or indirectly over operation conditions of the LED. The actual duration is a function of the emitted light of the LED. Once the useful life of the unit is coming to an end, the flash is exceeding a predetermined duration which may trigger a near-end-of-life process that could be used to indicate that the unit has to be serviced.

The idea in this embodiment is that a dynamic adjustment of the ecd of a an LED flashlight is desirable to prolong useful life and not unnecessarily overdrive the unit while maintaining a sufficient attraction raising perception, in a fashion that complies with legislation and human factors. The LED has a luminous output that varies significantly over temperature and aging-related degradation. The maximum allowable current depends on the momentary operational temperature of the LED. The strategy is to keep the current close to the maximum allowable amperage wherein reducing the flash-duration is sufficient to meet a predetermined value per Blondel-Rey.

There are various embodiments possible, especially for the logic determining the actual, already achieved effective candela and the near-end-of-life determination, trigger mechanisms and type of indication (e.g. flag) that is raised when the unit has detected that it should be replaced soon.

The preferred embodiment though is based on a maximum intensity flash that is kept on for a variable duration until it has achieved a predetermined effective candela value. This value can be dialed in during final assembly or testing and is used as a reference for the comparator checking if the predetermined effective candela has already been achieved. Once the required intensity has been reached, the power for the LED light sources are turned off to preserve useful life of the LEDs. The current regulator restricts the maximum current flowing through the LEDs based on the LED type and ambient temperature. The timer measures the duration the flash has been on and feeds the result to the NEOL trigger logic. The trigger logic uses the duration of the pulse to check if the pulse length exceeds a predetermined duration and preferably compares it with the temperature the unit has been operated with to trigger a flag that End Of Life will be reached shortly. The flag could be i.e. a blinking diode.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

LIST OF NUMERALS 1 normal flash
2 pause between normal flash and near-end-of-life-indicating flash
3 near-end-of-life-indicating flash
10 LED
12 control unit
14 temperature sensor
16 central control circuitry
18 adjustable current control means
20 switch
22 light intensity sensor
24 integrator
26 comparator
28 timer
30 comparator
32 near-end-of-life indicator
34 comparator

The invention claimed is:

1. Method for indicating that an LED flash light for an aircraft such as an anti-collision or beacon or strobe LED light has reached a near-end-of-life status, wherein the LED flash light under a normal operational condition within a given time interval generates a predetermined number of normal flashes, with the number being one or more than one, e.g. two, wherein the method comprises the steps of
   determining the actual photometric condition of the LED flash light by integrating a light intensity of the LED flash light for a single normal flash,
   comparing the actual photometric condition to a given condition in a normal flashing mode, and
   if the actual condition deviates from the given condition by less than a predetermined amount, adapting a flash duration of the predetermined number of normal flashes such that an integrated light intensity of a single normal flash reaches a pre-set threshold intensity value,
   if the actual condition deviates from the given condition by more than a predetermined amount, operating the LED flash light for generating within the given time interval at least one additional near-end-of-life-indicating flash (3) during the given time interval;
   wherein the given time interval is at most 200 ms and a pause between the predetermined number of normal flashes and the at least one additional near-end-of-life-indicating flash is at least 20 ms.

2. Method according to claim 1, wherein the flash light is operated so as to generate a single flash (1) per predetermined time interval and wherein the flash light, if its actual photometric condition deviates from the given condition by more than the predetermined amount, is operated so as to generate for each time interval at least a second or additional flash (3).

3. Method according to claim 1, wherein the second or additional flash (3) is generated after a delay (2) of 20 ms to 50 ms or 30 ms to 50 ms or 40 ms to 50 ms after the first or last normal flash (1).

4. LED flash light for an aircraft, such as an anti-collision or beacon or strobe aircraft light, wherein the LED flash light under a normal operational condition within a given time interval generates a predetermined number of normal flashes, with the number being one or more than one, e.g. two, the LED flash light comprising
   at least one LED light source (10) and
   a control unit (12) for controlling the LED light source (10) in a normal flashing mode,
   wherein the control unit (12) performs the followings steps:
   determining the actual photometric condition of the LED flash light by integrating a light intensity of the LED flash light for a single normal flash,
   comparing the actual photometric condition to a given condition in the normal flashing mode, and
   if the actual condition deviates from the given condition by less than a predetermined amount, adapting a flash duration of the predetermined number of normal flashes such that an integrated light intensity of a single normal flash reaches a pre-set threshold intensity value,
   if the actual condition deviates from the given condition by more than a predetermined amount, operating the LED flash light for generating within the given time interval at least one additional near-end-of-life-indicating flash (3);
   wherein the given time interval is at most 200 ms and a pause between the predetermined number of normal flashes and the at least one additional near-end-of-life-indicating flash is at least 20 ms.

* * * * *